United States Patent Office 3,405,067
Patented Oct. 8, 1968

3,405,067
HYDRAULIC FLUID
Benjamin F. Fay, Wilmington, Del., assignor to Atlas Chemical Industries, Inc., Wilmington, Del., a corporation of Delaware
No Drawing. Filed Nov. 8, 1965, Ser. No. 506,888
9 Claims. (Cl. 252—75)

ABSTRACT OF THE DISCLOSURE

A water-in-oil emulsion suitable for use as a fire-resistant hydraulic fluid containing petroleum lubricating oil, a condensation product of an adduct of a polyhydric alcohol and an epihalohydrin with a fatty carboxylic acylation product of a polyalkylene polyamine, a nonionic or an anionic emulsifier and water.

---

This invention relates to hydraulic fluids. More particularly, this invention relates to oil-base hydraulic fluids and water-in-oil emulsions suitable for use as fire-resistant hydraulic fluids.

Hydraulic systems are widely used in industry to an increasing extent in a great variety of applications, many of which are in areas wherein a flammable hydraulic fluid presents a serious safety hazard. As a consequence, many attempts have heretofore been made to produce a suitable fire-resistant hydraulic fluid for use in those applications in which a flammable hydraulic fluid might cause a dangerous or even disastrous outbreak of fire, particularly in those situations resulting from breaks in high-pressure hydraulic fluid lines or from leaks arising from mechanical or packing failures or other defects of the hydraulic system. Among the several hydraulic fluids which have been developed in attempt to answer the need for a fire-resistant hydraulic fluid are included those comprising chlorinated hydrocarbons, phosphate esters and water/glycol base fluids. These, however, have generally failed to gain acceptance for use in hazardous applications for one or more reasons which include high cost, leakage caused by low surface tension of the fluid, incompatibility with paint, or toxicity. In an effort to overcome some of the foregoing disadvantages of previous fire-resistant hydraulic fluids, water-in-oil hydraulic fluids have been introduced with the consequent result that the area of application of such fluids has been substantially widened, as for example, in the coal mining industry. Nevertheless, such emulsion fluids have themselves frequently been attended by one or more disadvantages of various kinds, including poor emulsion stability, poor lubricity, poor viscosity characteristics and poor corrosive protection.

It is, accordingly, an object of this invention to provide a water-in-oil emulsion suitable for use as a fire-resistant hydraulic fluid in a wide variety of applications.

It is another object of this invention to provide a fire-resistant water-in-oil emulsion hydraulic fluid which is easy to prepare and which requires a relatively small amount of emulsifier.

It is another object of this invention to provide a fire-resistant hydraulic fluid emulsion which is unusually stable, which provides good lubricity and corrosion protection, particularly in the vapor phase, and which has excellent low temperature characteristics when a suitable freezing point depressant is incorporated thereinto.

It is another object of this invention to provide an oil-base hydraulic fluid which is especially adapted for use in those applications wherein water contamination of the fluid in the hydraulic system may be encountered.

The foregoing objects and still further objects of this invention are achieved by providing an oil-base fluid which comprises a major proportion of petroleum lubricating oil and minor proportions of emulsifiers and which may be combined with a major proportion of water to provide a fire-resistant water-in-oil hydraulic fluid emulsion. In addition, in certain cases, a minor amount of a freezing point depressant, such as a glycol, may be desirably, but not necessarily, included.

The petroleum lubricating oils which may be used in accordance with the present invention are suitable mineral oil fractions derived from paraffinic, naphthenic or mixed base crudes. They should also be in the lubricating oil range and have a viscosity, as determined at 100° F., of from about 75 to about 300 SUS, preferably between 100 and 150. A typical mineral oil base of this kind is a high viscosity index refined mineral lubricating oil having the following properties:

| | |
|---|---|
| Gr., API°, 60° C. | 32.2 |
| Color, ASTM | 1 |
| Pour point, ° F. | 5 |
| Flash, ° F., COC | 370 |
| Fire, ° F. | 435 |
| Viscosity, SUS, at 100° F. | 103 |
| Viscosity index | 93 |
| Neutralization No. | 0.01 |

In accordance with the present invention the emulsifiers which are used in the preparation of the aforesaid oil base hydraulic fluid and water-in-oil emulsion are a combination of a cationic emulsifier as an essential component and alternatively either an anionic emulsifier or a nonionic emulsifier. Although it is well known that the combination in a common dispersing medium of an anionic emulsifier and a cationic emulsifier generally results in the precipitation or partial precipitation of the resulting high molecular weight product from the medium in which the emulsifiers were dissolved, it has been found that no substantial precipitation occurs when the particular cationic and anionic emulsifiers specified hereinafter are combined in accordance with the present invention, notwithstanding that some very small portion of the resulting product may become insoluble. Although this invention is in no wise limited by theoretical considerations, it is believed that the size of the product molecule and its marginal solubility in petroleum oil contributes to the effectiveness of the combination in the present application.

The cationic emulsifier used as an essential component in the preparation of the oil-base hydraulic fluid and water-in-oil emulsion of the present invention is a member of a class of cationic emulsifiers which comprises the condensation product of an adduct of a polyhydric alcohol containing from 3 to 6 hydroxyl groups per molecule thereof and an epihalohydrin with a basic amino nitrogen containing compound which is a fatty carboxylic acylation product of a polyalkylene polyamine having from 3 to 5 amino groups.

The above-mentioned adduct of a polyhydric alcohol and an epihalohydrin may be exemplified by the condensation of a polyhydric alcohol having 3 to 6 hydroxyl groups per molecule with an epihalohydrin in the presence of a catalyst, according to the following chemical reaction:

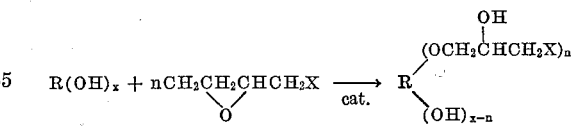

wherein X is a halogen having an atomic weight greater than 30, $x$ is a number from 3 to 6 and $n$ is a number from 1 to $x$. R is a hydroxyl-free radical of a polyhydric alcohol. When the polyhydric alcohol is a hexitol, from about one to about three mols of epihalohydrin are usually preferred.

The chemistry of the amidation reaction between fatty acids (or their equivalents) and polyalkylene polyamines to form the above-mentioned fatty carboxylic acylation product of a polyalkylene polyamine is well-known in the art. Under comparatively mild reaction conditions, a carbon to nitrogen bond is created and simple amides of the polyamines are formed. Depending upon the proportion of reactants, the amides which are formed may be mono-amides, diamides or higher amides. The following chemical equation, illustrating the formulation of a fatty acid diamide by reacting a fatty acid with diethylene triamine, is typical:

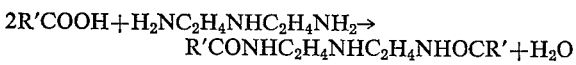

wherein R'COOH is a fatty acid containing from 12 to 22 carbon atoms. Under more severe conditions, particularly at high temperature, some of the first formed amides undergo a ring closing dehydration to form substituted cyclic nitrogen compounds, as for example, substituted imidazolines and substituted tetrahydropyrimidines. The following chemical equation, ilylustrating the formation of an imidazoline by reacting a fatty acid with diethylene triamine, is typical:

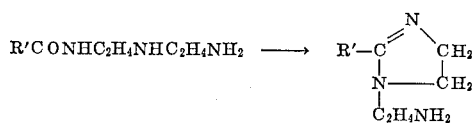

wherein R'COOH is a fatty acid containing from 12 to 22 carbon atoms.

The cationic emulsifier of the present invention which comprises the condensation product of the above-described adduct of a polyhydric alcohol and an epihalohydrin with the above-described fatty carboxylic acylation product of a polyalkylene polyamine may be characterized as salts of secondary amines, tertiry amines and quarternary ammonium bases. The reaction proportions are so selected that from 1 to 3, and, more desirably, from 1 to 2 base equivalents of the fatty acid-polyalkylene polyamine derivatives are condensed per halogen atom of the polyol-epihalohydrin ether. The following chemical equation is illustrative of the types of salts which may be formed from the several types of intermediates hereinbefore described:

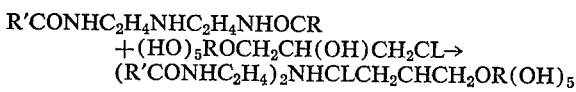

wherein R is a hydroxyl-free radical of a polyhydric alcohol containing 6 hydroxyl groups per molecule and R'CO represents an acyl group containing from 12 to 22 carbon atoms.

Various polyhydric alcohols, fatty acids, epihalohydrins and polyalkylene polyamines suitable for use in the formation of the intermediates used in the preparation of the cationic emulsifiers of the present invention are fully described and disclosed, together with methods of preparation of said intermediates and said cationic emulsifiers themselves, in U.S. Patent 3,060,182, issued Oct. 23, 1962, to John D. Zech, which patent is hereby incorporated heerinto by reference.

Representative of the classes of anionic emulsifiers which may be used as a component of the oil-base hydraulic fluid and water-in-oil emulsion of the present invention, are the fatty acid soaps, such as potassium oleate and sodium stearate, rosin acid soaps, such as the sodium salt of abietic acid; sulfated long chain fatty acids and salts thereof, such as the sodium salt of sulfated tall oil acids; naphthenic acid soaps, such as the sodium, potassium and ethanolamine soaps of naphthenic acids; alkyl sulfates, such as sodium lauryl sulfate, ammonium dodecyl sulfate, sodium myristyl sulfate, diethanolamine lauryl sulfate, triethanolamine oleyl sulfate, and sulfated cetyl alcohol; alkane sulfonates and petroleum sulfonates, such as sodium dodecane sulfonate, sodium petroleum sulfonate and ammonium petroleum sulfonate; alkyl aryl sulfonates, such as sodium dodecyl benzene sulfonate, sodium isopropyl naphthalene sulfonate and isopropylamine dodecyl benzene sulfonate; esters of salts of sulfated dicarboxylic acids, such as dihexyl sodium sulfosuccinate and tridecyl sodium sulfosuccinate; sulfated esters of fatty acids, such as sulfated glyceryl trioleate, sulfated methyl oleate and sulfated propyl oleate and sulfated fatty amides, such as sulfated monoethanolamide of coconut fatty acids, sulfonated monoethanolamide of palmitic acid and sulfated glycerol amide of caprylic acid.

Representative of the classes of nonionic emulsifiers which may be used as a component of the oil-base hydraulic fluid and water-in-oil emulsion of the present invention are polyoxyalkylated compounds having from 1 to 150 alkoxy groups per molecule thereof, including polyoxyalkylated alcohols, exemplified by polyoxyethylene (4) lauryl ether, polyoxyethylene (10) cetyl ether, polyoxyethylene (20) stearyl ether, polyoxyethylene (6) tridecyl ether, polyoxypropylene (10) searyl ether and polyoxyethylene (6) polyoxypropylene glycol (50); polyoxyalkylated fatty acid esters of partially anhydrized polyhydric alcohols, exemplified by polyoxyethylene (20) sorbitan trioleate, polyoxyethylene (20) sorbitan tristearate, polyoxyethylene (5) sorbitan monooleate, polyoxyethylene (20) sorbitan monolaurate and polyoxypropylene (20) sorbitan monolaurate; polyoxyalkylated alkyl aryl ethers, exemplified by polyoxyethylene (5) nonyl phenol polyoxyethylene (10) dodecyl phenol and polyoxypropylene (1) nonyl phenol; fatty acid esters of polyoxyalkylated polyhydric alcohols, exemplified by polyoxyethylene (50) sorbital hexaoleate polyoxyethylene (30) sorbital pentalaurate and polyoxypropylene (6) mannitol dioleate; fatty acid esters of partially anhydrized polyhydric alcohols, exemplified by sorbitan monooleate, sorbitan monolaurate, sorbitan tristearate and sorbitan trioleate and polyoxyalkylated fatty acids, exemplified by polyoxyethylene (8) stearate, polyoxyethylene (20) palmitate polyoxyethylene (8) laurate and polyoxypropylene (100) oleate.

Broadly, the water-in-oil hydraulic fluid of the present invention may be formulated of the following components within the following ranges of percentage composition by weight:

TABLE I

| Component | Percent by weight | |
|---|---|---|
| | Min. | Max. |
| Cationic emulsifier | 0.1 | 10.0 |
| Anionic or nonionic emulsifier | 0.1 | 10.0 |
| Mineral oil | 20.0 | 69.8 |
| Water | 30.0 | 79.8 |

Conveniently, although not necessarily, in the preparation of the water-in-oil emulsion of the present invention, an oil concentrate is first prepared which contains the cationic emulsifier and either the anionic emulsifier or the nonionic emulsifier in the amounts chosen for the formation of the emulsion fluid. The oil concentrate is itself suitable for use as a hydraulic fluid as desired. Broadly, the aforesaid oil concentrate may be formulated of the following components within the following ranges of percentage composition:

TABLE II

| Component | Percent by weight | |
|---|---|---|
| | Min. | Max. |
| Mineral oil | 50.0 | 99.71 |
| Cationic emulsifier | 0.143 | 33.3 |
| Anionic or nonionic emulsifier | 0.143 | 33.3 |

A specific example of a preferred formulation of an oil-base hydraulic fluid and a water-in-oil hydraulic fluid emulsion, as provided in accordance with this invention, is set forth below:

EXAMPLE 1

An oil concentrate, suitable for use as a hydraulic fluid and hereinafter designated oil concentrate A, was prepared according to the following formulation:

96% by weight of 100 SUS at 100° F. Solvent refined Mid-Continent neutral oil.
2.0% by weight of sorbitol epichlorohydrin (1:2.25 moles) condensation product of tallow acid diamide of diethylene triamine in the ratio of 1:2.33 mols.
2.0% by weight of isopropylamine dodecyl benzene sulfonate.

The oil concentrate was prepared by weighing out the required amount of oil and adding the correct amount of emulsifiers thereto. The oil was warmed and stirred until a homogeneous mixture was obtained.

Thereafter an emulsion was prepared having the following proportions by volume:

60% oil concentrate A
40% water

The emulsion was formed by adding the water at a slow, steady rate to the oil concentrate while it was being vigorously agitated with a high-shear mixing device.

The following are still further specific examples of the preparation of the oil-base hydraulic fluid and water-in-oil hydraulic fluid emulsion of the present invention.

EXAMPLE 2

A water-in-oil emulsion having the following proportions was prepared according to the method of Example 1.

50% by volume of oil concentrate A of Example 1.
50% by volume of water.

EXAMPLE 3

An oil-base hydraulic fluid in the form of an oil concentrate, hereinafter designated oil concentrate B, was prepared according to the following formulation:

94% by weight of the petroleum oil of Example 1.
3.5% by weight of the condensation product of sorbitol epichlorohydrin and tallow acid diamide of diethylene triamine in the ratio of 1:4.55 moles.
2.5% by weight of ethylamine dodecyl benzene sulfonate.

The oil concentrate was prepared according to the method of Example 1.

A water-in-oil emulsion having the following proportions by volume was prepared according to the method of Example 1:

50% of oil concentrate B
50% water

EXAMPLE 4

An oil concentrate, suitable for use as a hydraulic fluid and hereinafter designated oil concentrate C, was prepared having the following formulation:

94.5% by weight of the petroleum oil of Example 1.
3.5% by weight of the condensation product of sorbitol epichlorohydrin and tallow acids diamine of diethylene triamine in the ratio of 1:4.66 moles.
2.0% by weight of oxyethylene polyoxypropylene (5) ethylamine dodecyl benzene sulfonate.

The oil concentrate was prepared as in Example 1.

A water-in-oil emulsion having the following proportions by volume was prepared according to the method of Example 1:

50% oil concentrate C
50% water

EXAMPLE 5

An oil concentrate, suitable for use as a hydraulic fluid, and hereinafter designated oil concentrate D, was prepared according to the following formulation:

96% by weight of the petroleum oil of Example 1.
1.4% by weight of sorbitol epichlorohydrin condensation product of tallow acids diamide of diethylene triamine in the ratio of 1:2.33 moles
2.6% by weight of polyoxyethylene (5) nonyl phenol.
48% by weight of the petroleum oil of Example 1.

A water-in-oil emulsion having the following proportions by volume was prepared according to the method of Example 1:

60% oil concentrate D
40% water

EXAMPLE 6

A water-in-oil emulsion having the following proportions was prepared according to the method of Example 1:

40% by volume oil concentrate D
60% by volume water

EXAMPLE 7

An oil concentrate, suitable for use as a hydraulic fluid and hereinafter designated oil concentrate E, was prepared according to the following formulation:

96% by weight of the petroleum oil of Example 1.
2.0% by weight of the condensation product of sorbitol epichlorohydrin and tallow acids diamide of diethylene triamine in the ratio of 1:4.66 moles.
2.0% by weight polyexyethylene (20) sorbitan trioleate.

The oil concentrate was prepared as in Example 1.

A water-in-oil emulsion having the following proportions by volume was prepared according to the method of Example 1:

60% oil concentrate
40% water

The following are further specific examples of formulations of the water-in-oil emulsion as provided in accordance with this invention:

EXAMPLE 8

50% by weight of water.
48% by weight of the petroleum oil of Example 1.
1.8% by weight of the condensation product of sorbitol epichlorohydrin and tallow acids diamide diethylene triamine (1:4.66 moles).
0.2% by weight of sorbitan monooleate.

EXAMPLE 9

50% by weight of water.
48% by weight of the petroleum oil in Example 1.
1.5% by weight of the condensation product of sorbitol epichlorohydrin and tallow acids diamide of diethylene triamine (1:4.66 moles).
0.5% by weight polyoxyethylene (50) sorbitol hexaoleate.

EXAMPLE 10

50% by weight of water.
48% by weight of the petroleum oil of Example 1.
1.5% by weight of the condensation product of sorbitol epichlorohydrin and tallow acids diamide of diethylene triamine (1:4.66 moles).
0.5% by weight polyoxyethylene (30) sorbitol pentalaurate.

EXAMPLE 11

60% by volume oil concentrate D
35% by volume water
5% by volume ethylene glycol.

It will be appreciated that within the scope of the present invention a variety of additives may be incorporated into the hydraulic fluid described above in addition to the ethylene glycol illustrated in Example 11. Such additives, for example, may include anti-wear, anti-rust, anti-oxidant and coloring (dye) additives, as well as others.

It will be evident, too, that an important and advantageous feature of the oil-base hydraulic fluid as provided in accordance with this invention is its adaptability to use in those applications wherein water contamination of the fluid is likely, such as in marine equipment, in machinery used in mines or in dredging equipment or the like. Although ordinary oil-base hydraulic fluids may be ruined or badly damaged by such water contamination, thereby causing the hydraulic system to fail, the oil-base hydraulic fluid of this invention forms a water-in-oil emulsion wherein the contaminating water is sequestered into the internal phase thereof and continues to function excellently as a hydraulic fluid.

An important advantage of the invention resides also in the superior hydraulic fluid emulsion provided in accordance therewith wherein an especially effective boundary lubricant is provided in the oil phase thereof, thereby reducing metal-to-metal contact between the moving parts of the system and substantially reducing the wear of those parts. Moreover, an extremely stable emulsion is provided which keeps the oil in the external phase even under conditions of high shear, high pressure and elevated temperatures, thereby assuring proper lubrication of all moving parts in the hydraulic system of which it is a part. Still an added advantage of the hydraulic fluid emulsion of the present invention lies in the excellent corrosion inhibition of the combination of emulsifiers used therein.

Although this invention has been described with reference to specific materials including specific lubricating oils, specific cationic emulsifiers, anionic emulsifiers and nonionic emulsifiers, as well as specific additives, it will be apparent that still other different and equivalent materials may be substituted for those described. Moreover, processes and method steps may be modified, reversed or even in certain cases, eliminated, all within the spirit and scope of this invention as defined in the appended claims.

What is claimed is:
1. An oil-base hydraulic fluid which consists essentially of at least about 50% petroleum lubricating oil, from about 0.143% to about 33.3% of a cationic emulsifier which is the condensation product resulting from the reaction at a temperature from about 75° C. to about 150° C. of an adduct of a polyhydric alcohol and an epihalohydrin characterized by the generalized formula:

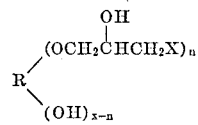

wherein X is a halogen having an atomic weight greater than 30, $x$ is a number from 3 to 6, $n$ is a number from 1 to $x$ and R is the hydroxyl-free radical of a polyhydric alcohol with a basic amino nitrogen-containing compound which is a fatty carboxylic acylation product of a polyalkylene polyamine having from 3 to 5 amino groups, said adduct and said basic amino nitrogen-containing compound being reacted in proportions of from about 1 to about 3 base equivalents of said amino nitrogen-containing compound per halogen atom of said adduct and from about 0.143% to about 33.3% of an emulsifier selected from the group consisting of anionic emulsifiers and nonionic emulsifiers.

2. The oil-base hydraulic fluid defined in claim 1 wherein said cationic emulsifier is the condensation product of sorbitol epichlorohydrin and the tallow acids diamide of diethylene triamine.

3. An oil-base hydraulic fluid according to claim 2 which contains isopropylamine dodecyl benzene sulfonate as an anionic emulsifier.

4. An oil-base hydraulic fluid according to claim 2 which contains polyoxyethylene nonyl phenol containing 5 ethoxy groups per molecule thereof as a nonionic emulsifier.

5. A water-in-oil emulsion which consists essentially of at least about 20.0% petroleum lubricating oil and 30.0% water, from about 0.1% to about 10% of a cationic emulsifier which is the condensation product resulting from the reaction at a temperature from about 75° C. to about 150° C. of an adduct of a polyhydric alcohol and an epihalohydrin characterized by the generalized formula:

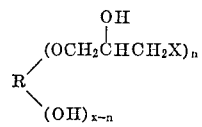

wherein X is a halogen having an atomic weight greater than 30, $x$ is a number from 3 to 6, $n$ is a number from 1 to $x$ and R is the hydroxyl-free radical of a polyhydric alcohol with a basic amino nitrogen-containing compound which is a fatty carboxylic acylation product of a polyalkylene polyamine having from 3 to 5 amino groups, said adduct and said basic amino nitrogen-containing compound being reacted in proportions of from about 1 to about 3 base equivalents of said amino nitrogen-containing compound per halogen atom of said adduct and from about 0.1% to about 10% of an emulsifier selected from the group consisting of anionic emulsifiers and nonionic emulsifiers.

6. The water-in-oil emulsion defined in claim 5 wherein said nonionic emulsifiers are selected from the group consisting of polyoxyalkylated alcohols, polyoxyalkylated fatty acids, polyoxyalkylated fatty acid esters of partially anhydrized polyhydric alcohols, polyoxyalkylated alkyl aryl ethers, and fatty acid esters of partially anhydrized polyhydric alcohols.

7. The water-in-oil emulsion defined in claim 5 wherein said anionic emulsifiers are selected from the group consisting of alkyl aryl sulfonates, alkane sulfonates and fatty acid soaps.

8. A water-in-oil emulsion according to claim 6 which contains polyoxyethylene nonyl phenol containing 5 ethoxy groups per molecule thereof as a nonionic emulsifier.

9. A water-in-oil emulsion according to claim 7 which contains isopropylamine dodecyl benzene sulfonate as an anionic emulsifier.

References Cited
UNITED STATES PATENTS 3,311,561  3/1967  Anderson et al. __ 252—77 XR
3,060,182  10/1962  Zech _____ 252—152 XR
2,213,477  9/1940  Steindorff et al. _____ 260—613

LEON D. ROSDOL, *Primary Examiner.*

STANLEY D. SCHWARTZ, *Assistant Examiner.*